(12) United States Patent
Walker et al.

(10) Patent No.: US 8,548,871 B2
(45) Date of Patent: Oct. 1, 2013

(54) SYSTEM AND METHOD FOR ALLOCATING BUSINESS TO ONE OF A PLURALITY OF SELLERS IN A BUYER DRIVEN ELECTRONIC COMMERCE SYSTEM

(75) Inventors: Jay S. Walker, Ridgefield, CT (US); Thomas M. Sparico, Stamford, CT (US); Robert S. Wisse, Half Moon Bay, CA (US)

(73) Assignee: Priceline.com Incorporated, Stamford, CT (US)

( * ) Notice: Subject to any disclaimer, the term of this patent is extended or adjusted under 35 U.S.C. 154(b) by 191 days.

(21) Appl. No.: 12/390,375

(22) Filed: Feb. 20, 2009

(65) Prior Publication Data
US 2009/0271285 A1 Oct. 29, 2009

Related U.S. Application Data

(63) Continuation of application No. 09/252,574, filed on Feb. 18, 1999, now Pat. No. 7,516,089, which is a continuation-in-part of application No. 08/889,319, filed on Jul. 8, 1997, now Pat. No. 6,085,169, which is a continuation-in-part of application No. 08/707,660, filed on Sep. 4, 1996, now Pat. No. 5,794,207.

(51) Int. Cl.
*G06Q 30/00* (2012.01)
(52) U.S. Cl.
USPC ............... 705/26.41; 705/26.3; 705/26.4
(58) Field of Classification Search
USPC ............ 705/1, 26, 27, 37, 1.1, 26.4, 26.41, 705/26.42, 26.43, 26.44, 26.3
See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |
| 4,247,759 | A | 1/1981 | Yuris et al. |
| 4,449,186 | A | 5/1984 | Kelly et al. |

(Continued)

FOREIGN PATENT DOCUMENTS

| | | |
|---|---|---|
| EP | 0512702 A2 * | 11/1992 |
| WO | 95/16971 | 6/1995 |

(Continued)

OTHER PUBLICATIONS

Hensley, H.W., "I'll Take Juarez; When It Comes to Negotiations, the Business Travel Industry Could Benefit from aShooping Trip to Juarez," Trave Weekly, vol. 45, p. 7, Feb. 1986.*

(Continued)

*Primary Examiner* — Nicholas D Rosen
(74) *Attorney, Agent, or Firm* — Cooley LLP; Walter G. Hanchuk; Nathan W. Poulsen

(57) ABSTRACT

A system and method for allocating conditional purchase offers (CPO) among a plurality of agency-based and broadcast-based sellers in a buyer-driven commerce system. In one embodiment, the system determines which agency-based or broadcast-based sellers can fulfill or satisfy the CPO and orders those sellers in a priority order. In another embodiment, the priority is determined by relative market share and number of recent opportunities to satisfy the CPO. In another embodiment, the priority is also determined by metrics and buyer information. In another embodiment, the priority is determined randomly. The system ensures that when a buyer can satisfy the CPO at multiple prices levels, the highest price level fulfills the CPO. This ensures maximum seller revenue for each CPO.

15 Claims, 10 Drawing Sheets

(56) References Cited

U.S. PATENT DOCUMENTS

| | | | |
|---|---|---|---|
| 4,553,222 A | 11/1985 | Kurland et al. | |
| 4,677,552 A | 6/1987 | Sibley, Jr. | |
| 4,751,728 A | 6/1988 | Treat | |
| 4,789,928 A | 12/1988 | Fujisaki | |
| 4,799,156 A | 1/1989 | Shavit et al. | |
| 4,903,201 A | 2/1990 | Wagner | |
| 4,931,932 A | 6/1990 | Dalnekoff et al. | |
| 4,959,686 A | 9/1990 | Spallone et al. | |
| 5,021,953 A | 6/1991 | Webber et al. | |
| 5,101,353 A * | 3/1992 | Lupien et al. | 705/37 |
| 5,136,501 A | 8/1992 | Silverman et al. | |
| 5,168,446 A | 12/1992 | Wiseman | |
| 5,191,523 A | 3/1993 | Whitesage | |
| 5,191,613 A | 3/1993 | Graziano et al. | |
| 5,224,034 A | 6/1993 | Katz et al. | |
| 5,243,515 A | 9/1993 | Lee | |
| 5,253,165 A | 10/1993 | Leiseca et al. | |
| 5,262,941 A | 11/1993 | Saladin et al. | |
| 5,283,731 A | 2/1994 | Lalonde et al. | |
| 5,289,371 A * | 2/1994 | Abel et al. | 705/5 |
| 5,297,031 A | 3/1994 | Gutterman et al. | |
| 5,329,589 A | 7/1994 | Fraser et al. | |
| 5,331,546 A | 7/1994 | Webber et al. | |
| 5,361,199 A | 11/1994 | Shoquist et al. | |
| 5,375,055 A | 12/1994 | Togher et al. | |
| 5,404,291 A | 4/1995 | Kerr et al. | |
| 5,420,914 A | 5/1995 | Blumhardt | |
| 5,426,281 A | 6/1995 | Abecassis | |
| 5,444,630 A | 8/1995 | Dlugos | |
| 5,448,471 A * | 9/1995 | Deaton et al. | 705/14.25 |
| 5,467,269 A | 11/1995 | Flaten | |
| 5,484,988 A * | 1/1996 | Hills et al. | 235/379 |
| 5,500,793 A | 3/1996 | Deming, Jr. et al. | |
| 5,517,555 A | 5/1996 | Amadon et al. | |
| 5,519,769 A | 5/1996 | Weinberger et al. | |
| 5,553,131 A | 9/1996 | Minervino, Jr. et al. | |
| 5,557,517 A | 9/1996 | Daughterty, III | |
| 5,557,518 A | 9/1996 | Rosen | |
| 5,570,283 A | 10/1996 | Shoolery et al. | |
| 5,590,038 A * | 12/1996 | Pitroda | 705/41 |
| 5,592,375 A | 1/1997 | Salmon et al. | |
| 5,606,602 A | 2/1997 | Johnson et al. | |
| 5,611,052 A | 3/1997 | Dykstra et al. | |
| 5,615,269 A | 3/1997 | Micali | |
| 5,640,390 A | 6/1997 | Sakamoto et al. | |
| 5,664,115 A | 9/1997 | Fraser | |
| 5,689,652 A | 11/1997 | Lupien et al. | |
| 5,694,551 A | 12/1997 | Doyle et al. | |
| 5,696,965 A | 12/1997 | Dedrick | |
| 5,715,399 A | 2/1998 | Bezos | |
| 5,715,402 A | 2/1998 | Popolo | |
| 5,717,989 A | 2/1998 | Tozzoli et al. | |
| 5,732,400 A | 3/1998 | Mandler et al. | |
| 5,745,882 A | 4/1998 | Bixler et al. | |
| 5,757,917 A | 5/1998 | Rose et al. | |
| 5,758,328 A * | 5/1998 | Giovannoli | 705/26 |
| 5,774,883 A | 6/1998 | Andersen et al. | |
| 5,794,207 A | 8/1998 | Walker et al. | |
| 5,794,219 A | 8/1998 | Brown | |
| 5,797,127 A | 8/1998 | Walker et al. | |
| 5,799,285 A | 8/1998 | Klingman | |
| 5,809,478 A | 9/1998 | Greco et al. | |
| 5,822,737 A | 10/1998 | Ogram | |
| 5,826,244 A | 10/1998 | Huberman | |
| 5,832,452 A | 11/1998 | Schneider et al. | |
| 5,835,896 A | 11/1998 | Fisher et al. | |
| 5,845,265 A | 12/1998 | Woolston | |
| 5,878,403 A | 3/1999 | DeFrancesco et al. | |
| 6,236,977 B1 * | 5/2001 | Verba et al. | 705/10 |
| 6,243,691 B1 * | 6/2001 | Fisher et al. | 705/37 |
| 6,260,024 B1 * | 7/2001 | Shkedy | 705/37 |
| 6,453,306 B1 * | 9/2002 | Quelene | 705/80 |
| 7,516,089 B1 * | 4/2009 | Walker et al. | 705/26 |

FOREIGN PATENT DOCUMENTS

| | | |
|---|---|---|
| WO | 96/13013 | 5/1996 |
| WO | 96/34356 | 10/1996 |
| WO | 97/16797 | 5/1997 |
| WO | 97/46961 | 12/1997 |
| WO | 98/10361 | 3/1998 |
| WO | WO-0042547 A2 * | 7/2000 |

OTHER PUBLICATIONS

Anon., "Electrical," Chilton's Harware Age, vol. 223, p. 31, Apr. 1986.*

Hick, V., "Winners," St. Louis Post Dispatch, Three Star Edition, p. 4B, Mar. 17, 1992.*

Perkins, B., "How to Make Merchants Do Your, and Their, Bidding," San Jose Mercury News, Morning Final Edition, p. 3F, Apr. 24, 1992.*

Davies, D., "Philadelphia Gas Works to Sell Appliances Unit to American Appliance," Philadeplhia DAily News, Aug. 16, 1995.*

Ricadela, A., "Mail Order Finds Friend in Online Sales—Catalog Operations Complemented by Web Efforts," Computer Retail Week, p. 3+, Jun. 2, 1997.*

Anon., "The Huntington National Bank, Compaq and SARCOM Announce Business Banking Alliance," PR Newswire, p. 626CLF006, Jun. 26, 1998.*

Carroll, S., "Ciba Planning to Add a Second Pigments Joint Venture in China," Chemical Market Reporter, vol. 254, No. 6, p. 17, Aug. 10, 1998.*

Banatre, Jean-Pierre, et al., "The Design and Building of Enchere, a Distributed Electronic Marketing System," Communications of the ACM, vol. 29, No. 1, Jan. 1986.*

Anon., "Another Reason to Love Those Affluent Customers," Jewelers' Circular-Keystone, vol. CLXX, No. 7, p. 64, Jul. 1999.*

"UK's World Telecom Unveils New WorldSaver Tariffs," Newsbytes, Information Access Company (Feb. 13, 1997).*

Sothebys General Information, downloaded from www.sothebys.com (1996).*

Del Rosso, Laura, "Ticket-Bidding Firm Closes Its Doors," Travel Weekly, Mar. 12, 1992.*

"NASDAQ Adds Enahncements to SOES Limit Order File," Securities Week, Nov. 26, 1990, p. 5.*

Greenberg, Peter S., "Judging Deregulation," The Record, Jul. 22, 1990, at p. T01.*

Greenberg, Peter S., "The Savvy Traveler: Lower AIr Fares for Consumers Not in the Cards; Airlines: Remember When It Cost $16 to Fly from Los Angeles to San Francisco? Then You Remember the Days Before Deregulation. Since Then, Prices Have Soared", Los Angeles Times, Jul. 8, 1990, at p. L2.*

Fishkin, Ken, Foresight Exchange Tutorial: (http://www.ideosphere.com/fx/docs/tutorial.html) Feb. 19, 1999 at pge. 1-5.

"Bid.com 1998 Third-Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtual/H/virtualH/virtualh02.html), download date: Sep. 20, 1998.

"First Source Become a Member", More Reasons to Join First Source!(http://www.fsource.com/bene.html), download date: Sep. 20, 1998.

Jeffrey Davis, "Big Storm rising", Business 2.0 Sep. 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, downloaded date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred bidder Harvest, Sep. 1997, pge 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.
TradingFloor: General Trading Information and Terms, downloaded from www.tradingfloor.com on Aug. 14, 1997.
HomeShark: Refinance Check, selected pages downloaded from www.homeshark.com on Aug. 13, 1997.
The Loan Process, downloaded form www.sdtech.com/mls/process on Aug. 7, 1997.
Trade-Direct: We Help You Trade With Confidence, selected pages downloaded from www.trade-direct.com on Aug. 6, 1997.
Classifieds2000: The Internet Classifieds, selected pages downloaded from www.classifieds2000.com on Aug. 6, 1997.
Internet Mortgage Service Eliminates Loan Agents and Passes Commissions on to the Cosumer, Company Press Release, Yahoo Business Wire (Jun. 30, 1997).
Frequently Asked Questions About: Airhitch, selected pages downloaded from www.isicom.com.fr/airhitch on May 6, 1997.
Hitch a Flight to European, selected pages downloaded from www.travelassist.com on May 6, 1997.
Airhitch: Your Way to Low Cost Travel, selected pages downloaded from www.vaportrails.com on May 6, 1997.
Kelsey, J. and Schneier, B., Conditional Purchase Orders, $4^{th}$ ACM Conference on Computer and Communications Security, ACM Press, 117-124 (Apr. 1997).
Bryant, Adam, "Shaking Up Air Fares' Status Quo", The New York Times, Mar. 31, 1997.
Silverman, Robert, "GM Drives Wed Ad Insertion Network", Inside Media, Feb. 26, 1997, vol. 9, No. 4, pge 1; ISSN:1046-5316.
"Flycast Introduces Unique 'Open Exchange' Match-Making Service", Interactive Marketing News, Feb. 21, 1997, vol. 4, No. 8.
"TransQuest and Web Ventures Deliver Internet Booking for Delta Air Lines", PR Newswire, Dec. 10, 1996, Financial News Section.
"Affinicast Enables Web Sites That Listen and Adapt to Customer Affinities", PR Newswire, Dec. 3, 1996.
"Web Ventures Presents BookIt!" press release printed from http://www/webventures.com/bookit/(Web Ventures World Wide Web site) on Dec. 2, 1996.
"World's First Real-Time Travel Auction Service to be Available Via World Wide Web: ETA to Open Bidding to Consumer," Business Wire, DIALOG Trade & Industry Database (Nov. 4, 1996).
Gessel, Chris, "Trade Smarter: The Limit of Orders"; Investor's Business Daily, Oct. 14, 1996, p. A1.
CREST: Cruise/Ferry Revenue Management System, selected pages downloaded from www.rtscorp.com on Aug. 5, 1996.
Nishimoto, Lisa, "Travel Services Are First Online Commerce Offerings to Fly," Infoworld, Jul. 29, 1996, downloaded from http://www.infoworld.com.
About Rate Hunter, dowloaded from http://207.49.64.77/rhprodrh.htm on Jul. 14, 1996.
Cathay Pacific Online Ticket Bidding, World Internet News Digest (May 8, 1996).
CyberBid, Net Fun Ltd.(1996).
Nimmer, Raymond, T., "Electronic Contracting; Legal Issues", 14 J. Marshall J. Computer & Info L.211, Winter, 1996.
American Law Institute, Draft-Uniform Commercial Code Revised Article 2 (Sales), parts 2, 3, and 7, pp. 1-15, Jan. 4, 1996.
Speidel, Richard E. & Schott, Lee A., "Impact of Electronic Contracting on Contract Formation Under Revised UCC Article 2, Sales",C878 ALI-ABA 335, Dec. 9, 1993.
Hainer, Cathy and Grossman, Cathy Lynn, Today, "Where Vacationing Kids Get Good Care", USA Today, Apr. 1, 1992, at p. 4D.
"Newsletters", The Atlanta Constitution, Mar. 1, 1992, pge. K13.
"CRTL's Blue Ribbon Deals for 1992", Consumer Report Travel Letter, Jan. 1992, vol. 8, No. 1, at pp. 3-5.
Traveler's Notes; Bookit Report, Consumer Report Travel Letter, Dec. 1991 at pge. 143.
Feldman, Joan M., "To Rein in Those CRSs; Computer Reservation Systems", Air Transport World, Dec. 1991, at pge 89.
"Money Briefs; Buy Low, Fly High", Gannet News Service, Nov. 20, 1991.
"Buy Low, Fly High", USA Today, Nov. 14, 1991, at pge. 15.
Traveler's Note; Easier Airfare Bidding, Consumer Reports Travel Letter, Oct. 1991 at pge 119.

Nelson, Janet "Practical Traveler; Airlines Relaxing Policy on No-Refund Tickets", The New York Times, Sep. 22, 1991 at pge. 3 of Section 5.
Pelline, Jeff, "New Service; Now You Can Make a Bid on Your Next Airline Ticket Home", The Orange County Register, Sep. 1, 1991 at pge. E01.
"Bookit Airfare Bidding System (Fax for Your Plane Ticket?)", Consumer Reports Travel Letter, Sep. 1991, pges. 97 & 106.
Upton, Kim "French Say Monoliths Off-limits to Visitors", Los Angeles Times, Aug. 25, 1991.
Pelline, Jeff, "Travelers Bidding on Airline Tickets; SF Firm Offers Chance for Cut-Rate Fares", San Francisco Chronicle, Section A4, Aug. 19, 1991.
Carey, Christopher, "Firm Offers Auction For Airline Tickets", St. Louis Post-Dispatch, Aug. 7, 1991 at pge 1B.
Del Rosso, Laura, "Marketel Says It Plans to Launch Air Fare 'Auction' in June", Travel Weekly Apr. 29, 1991.
Ritter, Jeffrey B., "Scope of the Uniform Commerical Code: Computer Contracting Cases and Electrical Commerical Practices", 45 Bus. Law 2533, Aug. 1990.
Wallace, David, "Company Planning to Let Fliers Bid on Airfares", Philadelphia Business Journal, Mar. 26, 1990 at pge 15.
"Letter to Business Extra", The San Francisco Chronicle, Dec. 26, 1989 at pge C7.
Schrage, Michael, "An Experiment in Economic Theory; Labs Testing Real Markets", The Record Section B1, Nov. 26, 1989.
Schrage, Michael Innovation/Michael Schrage: Laboratory Experiments with Market Economics, Los Angeles Times, Nov. 23, 1989 at pge. D1.
Golden, Fran "AAL's Riga Doubts Marketel's Appeal to Retailers", Travel Weekly, Nov. 13, 1989.
Del Rosso, Laura, Firm Proposes ticket-bidding system; Marketel explores electronic auction of travel; Marketel International., Travel Weekly, Section No. 91, vol. 48, p. 1; Nov. 13, 1989.
Carlsen, Clifford, "Polaris Group Set to Fly the Leveraged Sky", San Francisco Business Times, Nov. 6, 1989 at pge. 1.
Kuttner, Robert, "Computers May Turn the World into One Big Commodities Pit", Business Week, Sep. 11, 1989.
Carlsen, Clifford, "From Airline Tickets to Human Organs, the Electronics Markets Are Booming", San Francisco Business Times, Aug. 14, 1989 at pge. 17.
"Public May Submit Bids to Get Bargain Rates", Wall Street Journal, Section 2; p. 1, col. 1; Aug. 1, 1989.
American Airlines Internet Silent Auction, selected pages downloaded from www.americanair.com.
Apollo Host Computer, selected pages downloaded from www.appollo.com.
"Auctioning unsold airline tickets." (http://www.newciv.org/GIB/BOV/BV-409.HTMI), at pge 1.
Cathay Pacific: CyberTraveler Auction #3—Official Rules, selected pages downloaded from www.cathaypacific.com.
CSM Online: About Collector's Super Mall downloaded from www.csmonline.com.
Sabre Decision Technologies, selected pages downloaded from www.sabre.com.
PhoneMiser: Frequently Asked Questions, downloaded from www.phonemiser.com.
The United Computer Exchange: How It All Works, selected pages downloaded from www.uce.com.
Tired of Shopping for the Best Home Loan?, Mortgage Loan Specialists.
Lancorp Mortgage Services, http://www.lancorp-mortgage.com/retailpa.htm, 1998.
Inland Mortgage Corporation, http://inlandmortgage.com/index.htm, 1998.
The Mortgage Store, http://www.mortgagestore.com, 1998.
Golden Age Antiques and Collectibles Online Auction, http://www.goldage.com, 1997.
Moran, Susan, "Xerox Won't Duplicate Past Errors", Business Week, Sep. 29, 1997.
Coleman, Zach "Electronic Trading System Matches Buyers, Seller", Atlanta Business Chronicle, vol. 20; No. 12; p. 37A, Aug. 22, 1997.

"What's Holding Up E-Cash?", Cybernautics Digest, vol. 3; No. 7, Finance.

Resnick, Paul et al, "Roles for Electronic Brokers", http://ccs.mit.edu/CCSWP179.htm, 1997.

Philatelists Online Information, http://www506.bonsai.com/q/@131354lhyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade-direct, http://www.trade-direct.com, 1997.

"Internet Mortgage Service Eliminates Loan Agents and Passes Commissions on to the Consumer", Yahoo! Finance, 1997.

Negroponte, Nicholas, "Pay Whom Per What When, Part 2", Negroponte, Issue 5.03, 1997.

"Ticketing revolution Could Triple Airline Profits, Analyst Says", Aviation Daily, vol. 325; No. 11; p. 87, 1996.

"Auctioning Unsold Airline Tickets", adapted extract from Insight (USA), The Global Ideas Bank, 1996.

Rockoff, Todd E., et al., "Design of an Internet-based system for remote Dutch auctions," Internet Research: Electronic Networking Applications and Policy, vol. 5, No. 4, pp. 10-16, 1995.

Franklin, Matthew K., et al., "The Design and Implementation of a Secure Auction Service," Proceedings: 1995 IEEE Symposium on Security and Privacy, pp. 22-14, 1995.

Tenenbaum, Jay M., et al.,"CommerceNet: Spontaneous Electronic Commerce on the Internet," 1995 IEEE Spring Conference, pp. 38-43.

Sirbu, Marvin and Tygar, J.D., "NetBill: An Internet Commerce System Optimized for Network Delivered Services," IEEE 1995 Spring Conference, pp. 20-25.

Bunker, Ted, "How Auction Technology Sped and Enhanced Sale of Radio Licenses," Investor's Business Daily, Executive Update, Regulation, p. A3, Feb. 24, 1995.

"AUCNET: The Story Continues", Harvard Business School, Jan. 17, 1995.

Anand, R., and Rao, M. Padmaja, "The Electronic Flea Market", IBM Research Division: Research Report, pp. 1-18, Jul. 28, 1994.

"Unusual Farmland Auction Set," Harrison Scott Publications, Liquidation Alert, Mar. 28, 1994.

"The Computer Museum brings auction block to cyberspace in First Internet Auction," Business Wire Mar. 14, 1994.

Freeman, Brian and Gideon, Lidor, "Hosting Services—Linking the Information Warehouse to the Information Consumer," IEEE 1994 Spring Conference, pp. 165-171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order for Business & Leisure Travel", Marketel International, Inc., 1991.

Inhaber, Herbert, "How to Solve the Problem of Siting Nuclear Waste," Transactions of the American Nuclear Society, vol. 62, Nov. 11-15, 1990.

Dyson, Esther, "Information, Bid and Asked," Forbes, Aug. 20, 1990.

"Mercado electronico, El chance de regatear por computador", CIENCIA Technologia E Informatica, Mar. 21, 1990 (Translation enclosed).

Cole, Jeff, "Fare bidding plan could be the ticket", St. Paul Pioneer Press Dispatch, Mar. 11, 1990.

Miller, Ross M., "The Design of Decentralized Auction Mechanisms that Coordinate Continuous Trade in Synthetic Securities," Journal of Economic Dynamics and Control, pp. 237-253, 1990.

Koepper, Ken, "Room Inventory Auctioning: The Next CRS Generation", Lodging, Jan. 1990 at pp. 26, 29-30.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way to Purchase Travel, Automated Service Would Let Companies Bid for Already-Filled Airline Seats", Business Travel News, Nov. 6, 1989.

"An Electronic Auction Ahead for Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronics Markets are Booming", Times, vol. 3, No. 50, Aug. 14, 1989.

Coyne, Andrew, "Unbundling ideas may alter world of politics,"The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"AUCNET: TV Auction Network System," Harvard Business School, Jul. 19, 1989.

Sammer, Harald W., "Online Stock Trading Systems: Study of an Application," IEEE 1987 Spring Conference, pp. 161-162.

Littlefair, T., "Homelink: a unique service," Computer Bulletin, pp. 12-14, Jun. 1986.

Turnoff, Murray and Chinai, Sanjit, "An Electronic Information Marketplace," Elsevier Science Publishers B.V., pp. 79-90, 1985.

Banatre, Michel, "Distributed auction bidding system," IPC Business Press, Computer Communications, vol. 4, No. 4, Aug. 1981.

Gibson. R., et al., "Marketing: Fast-Food Chain Hope Diners Swallow New Value Menu of Higher-Priced Items," The Wall Street Journal, Mar. 13, 1992, p. B1.

Turcsik, R., "Industry Lacks Market Savvy: Levy," Supermarket News, vol. 41, No. 46, p. 4, Nov. 11, 1991.

Anon., "Bulk Meat Business to Give Refunds under Agreement with Preate," PR Newswire, Oct. 26, 1993.

Anon., Washington State Attorney General Gregoire Announces Record Settlement against Auto Dealer, PR Newswire, Jul. 15, 1994.

Goldstein, D., "Key to Store's Success: Friendly Service," Computer Retail Week, p. 14, Nov. 28, 1994.

Moorehouse, M., "Teen Admits Slaying on Videotape He Says He's 'Sorry' Pregnant Clerk Died," Atlanta Journal, p. C/6, Feb. 28, 1995.

Davies, D., "Philadelphia Gas Works to Sell Appliances Unit to American Appliance," Philadelphia Daily News, Aug. 16, 1995.

Ricadela, A., "Mail Order Finds Friend in Online Sales—Catalog Operations Complemented by Web Efforts," Computer Retail Week, p. 3, Jun. 2, 1997.

Anon., "India: Hyundai Testing Indigenous Engines for Mid-Size Car," Hindu, Jan. 5, 1999.

"PC Magazine Names the Best PC's," Ziff-Davis press release, Nov. 25, 1997.

* cited by examiner

| ORIGINATING AIRPORT | DESTINATION AIRPORT | DATE | TIME OF DEPARTURE | TIME OF ARRIVAL | AIRLINE | FLIGHT NUMBER | VIA |
|---|---|---|---|---|---|---|---|
| JFK | LAX | 01/01/97 | 7:00 AM | 3:04 PM | AMERICAN | 226 | CHICAGO |
| JFK | SFO | 03/03/97 | 3:00 PM | 7:10 PM | UNITED | 300 | NON-STOP |
| BNA | LAX | 12/12/96 | 12:00 PM | 6:00 PM | AMERICAN | 1870 | NON-STOP |

SYSTEM AND METHOD FOR ALLOCATING BUSINESS TO ONE OF A PLURALITY OF SELLERS IN A BUYER DRIVEN ELECTRONIC COMMERCE SYSTEM

CLAIM TO PRIORITY

This is a Continuation of prior U.S. patent application Ser. No. 09/252,574, filed Feb. 18, 1999 now U.S. Pat. No. 7,516,089, entitled, "SYSTEM AND METHOD FOR ALLOCATING BUSINESS TO ONE OF A PLURALITY OF SELLERS IN A BUYER DRIVEN ELECTRONIC COMMERCE SYSTEM,"which in turn is a Continuation-In-Part of prior U.S. patent application Ser. No. 08/889,319, entitled, "Conditional Purchase Offer Management System," filed Jul. 8, 1997 now U.S. Pat. No. 6,085,169, which in turn is a Continuation-In-Part of prior U.S. patent application Ser. No. 08/707,660, filed Sep. 4, 1996 (U.S. Pat. No. 5,794,207, issued Aug. 11, 1998). The entire contents of the aforementioned applications are herein expressly incorporated by reference.

FIELD OF THE INVENTION

The present invention relates generally to a system for processing the sale of goods and services and, more particularly, to a system and method for the allocation of business among multiple sellers within a buyer-driven commerce system.

BACKGROUND OF THE INVENTION

Most systems for processing the sale of products are seller-driven, whereby the seller prices, packages, configures and offers the product for sale, and the buyer decides whether or not to accept the seller's offer. In a buyer-driven system, however, the buyer dictates the terms of the offer and one or more sellers decide whether or not to accept the offer. A "help wanted" advertisement, for example, is a buyer-driven inquiry since the employer is looking to locate and buy the services of a qualified employee. The inquiry is advertised to a large number of potential employees, who may respond by submitting their resumes to the prospective employer.

Priceline.com, Incorporated of Stamford, Conn. is a merchant that has successfully implemented a buyer-driven system for the sale of products such as airline tickets and automobiles. Priceline.com utilizes a Conditional Purchase Offer (CPO) Management System, described in U.S. Pat. No. 5,794,207 and International Application Number PCT/US97/15492, that processes Conditional Purchase Offers and/or Binding Conditional Purchase Offers (Binding CPO's) received from individual consumers. These CPO's contain one or more buyer-defined conditions for the purchase of goods or services, at a buyer-defined price. The Binding CPO's are typically guaranteed by a general-purpose account, such as a debit or credit account, and thereby provide sellers with a mechanism for enforcing any agreement that may be reached with the consumer. The CPO's are provided by the CPO management system to sellers, either directly or using seller-supplied rules, for individual sellers to either accept or reject. If a seller accepts a Binding CPO, the CPO management system binds the buyer on behalf of the accepting seller, to form a legally binding contract.

Thus, the CPO management system empowers individual consumers to obtain goods and services at a price set by the consumer. The CPO management system provides numerous commercial advantages to sellers as well. For example, the CPO management system permits individual sellers to effectively sell excess capacity when actual demand fails to meet forecasted demand. In particular, the CPO management system provides an effective mechanism for sellers to be confident that if they accept a consumer's offer, the consumer will purchase the requested goods or services at the agreed-upon price, and not just use the information to ascertain the seller's underlying level of price flexibility, which, if known to a seller's competitors or customers, could impact the seller's overall revenue structure.

For some sellers, and the airline industry in particular, response to an individual CPO is difficult without significant re-engineering of the existing transaction processing system. As a result, these sellers empower an agent to manage buyer-driven commerce transactions. These sellers become agency-based sellers, with a CPO management system acting as their agent. However, with multiple agency-based sellers, there is no method for the CPO management system to allocate CPO's among the agency-based sellers.

It is also possible that an agency-based seller can satisfy a CPO with more than one seller-defined CPO rule. There currently exists no method for the CPO management system to select the seller-defined CPO rule generating the maximum revenue for the agency-based seller.

For broadcast-based sellers, some form of allocation is also desirable. This is particularly helpful where allocation based on the order of seller response is not possible or appropriate. For example if two broadcast-based sellers respond at the same time, there must be some method for allocating the CPO among them. Similarly, for broad-cast based sellers it may be appropriate to allocate or limit the CPO to particular sellers based on region of business, market area, service history or other factors.

SUMMARY OF THE INVENTION

The invention provides a system and method for allocating conditional purchase offers (CPOs) in a buyer-driven system. First look and second look sellers are identified based on their market share in a relevant market. In identifying first and second look sellers, the system and method also considers the numbers of first look opportunities given as compared to numbers of first look opportunities due. The first look seller is given the first opportunity to satisfy the CPO. If the first look seller is unable to satisfy the CPO, the second look seller is given an opportunity to satisfy the CPO. If neither the first nor second look sellers are able to satisfy the CPO, the system performs a price-oriented search across the remaining sellers.

When a seller is able to satisfy the CPO with more than one rule or price, the system and method preferably identify the highest value rule or highest price that will satisfy the CPO. In this manner, the seller maximizes its revenue from a CPO.

DESCRIPTION OF THE FIGURES

FIG. 5 is a table from a database illustrating rules in a CPO management system;

The Figures are understood to provide representative illustration of the invention and are not limiting in their content.

DETAILED DESCRIPTION

Figure 1:
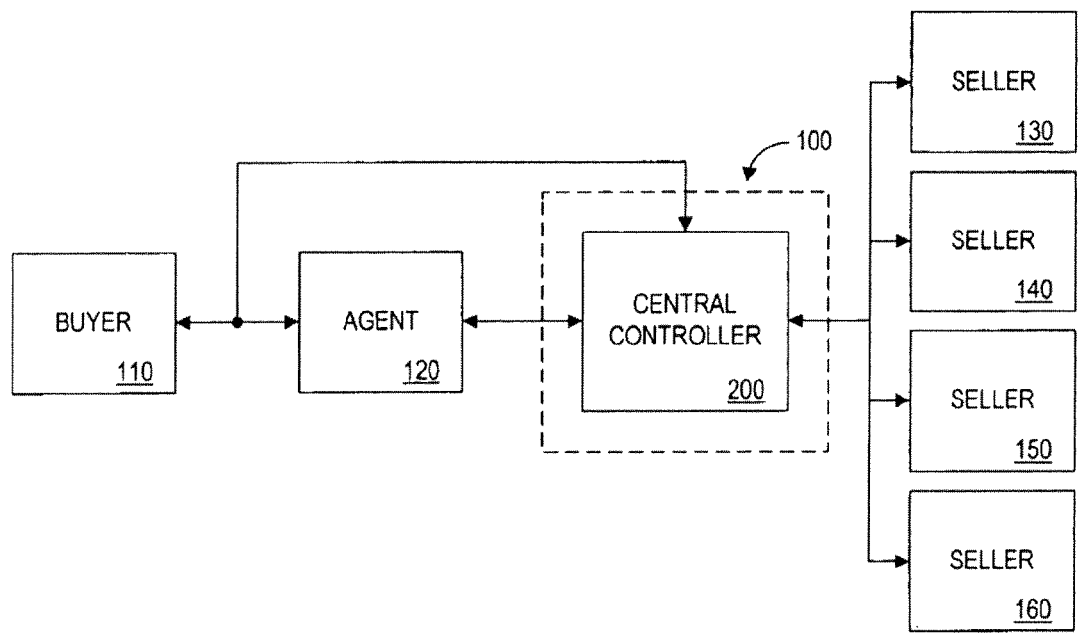
FIG. 1 is a block diagram illustrating major elements in the system of the invention.

FIG. 1 shows a first embodiment of a conditional purchase offer (CPO) management system 100 for receiving and processing CPO's for one or more goods or services, from one or more buyers 110 or agents 120 (on behalf of buyers 110). The CPO management system 100 determines whether one or more sellers, such as sellers 130, 140, 150, 160 are willing to accept a given CPO. As discussed further below, if a seller accepts a given CPO, the CPO management system 100 binds the buyer on behalf of the accepting seller, to form a legally binding contract.

As used herein and in the claims, the following terms are defined to mean:

Agency-Based Seller—A seller who has delegated authority to the CPO Management System to accept or reject a given CPO using seller-defined CPO Rules Broadcast-Based Seller—A seller who has received a CPO from the CPO Management System (directly or by, for example, access to an electronic posting) for evaluation.

Conditional Purchase Offer (CPO)—An offer containing one or more conditions submitted by a buyer for the purchase of goods and/or services at a buyer-defined price.

Binding Conditional Purchase Offer (Binding CPO)—A binding offer containing one or more conditions submitted by a buyer for the purchase of goods and/or services at a buyer-defined price. As compared to a CPO, a Binding CPO includes a payment guarantee, for example with a General Purpose Account, and authorization to debit the Account upon acceptance of the Binding CPO.

Conditional Purchase Offer (CPO) Rule—A restriction defined by a Broadcast-Based or Agency-Based Seller under which the operator of the CPO Management System may act as an agent to determine whether to fill a CPO for that Seller.

CPO Management System—A controller that receives and processes CPO's for one or more goods or services, from one or more buyers, to determine if one or more sellers (Agency-Based or Broadcast-Based Sellers) are willing to accept a CPO.

General Purpose Account—Any account from which payment can be made, including a credit or debit account.

First Look Opportunity—The initial opportunity given to a seller to satisfy a CPO, when the CPO management system allocates a CPO among multiple sellers.

Second Look Opportunity—The follow-up opportunity given to a seller to satisfy a CPO, when the CPO management system allocates a CPO among multiple sellers. If the CPO is unsatisfied in the first look opportunity, the seller given the follow-up opportunity to satisfy the CPO receives the second look opportunity.

Rule—A restriction or restrictions defined by a seller which must be satisfied before the seller will honor a particular price or sale. In the airline industry, rules include among other requirements black-out dates, day of week for origination, minimum and maximum stay length, advanced purchase requirements and cancellation/change terms.

Metric—A ranking parameter used to prioritize sellers. A metric can include seller factors such as market share, buyer factors such as preference, and random factors.

As shown in FIG. 1, the CPO management system 100 preferably includes a central controller 200, discussed further below in conjunction with FIG. 2. The CPO management system 100 may provide a given CPO to selected sellers 130, 140, 150, 160 based on predefined screening criteria, so that sellers only obtain CPO's that they may be interested in or are authorized to screen or have the potential to fulfill. Alternatively, the CPO management system 100 may provide all CPO's to all sellers for screening.

As discussed further below, each buyer 110 contacts the CPO management system 100, for example, by means of telephone, facsimile, online access (i.e. the Internet), electronic mail, in-person contact or through an agent, and provides the CPO management system 100 with the terms of the buyer's CPO. It is noted that each buyer 110 and seller 130, 140, 150, 160 may employ a general-purpose computer for communicating with the CPO management system 100. Though not illustrated, the general-purpose computer is preferably comprised of a processing unit, a communication device (e.g. a modem), memory means and any software required to communicate with the CPO management system 100.

The CPO management system 100, as well as any general-purpose computers utilized by buyers 110 or sellers 130, 140, 150, 160 (collectively, the "nodes") preferably transmit digitally encoded data and other information between one another. The communication links between the nodes preferably comprise a cable, fiber or wireless link on which electronic signals can propagate.

Agency and Broadcast-Based Sellers

According to one feature of the present invention, the CPO management system 100 preferably provides an optional agency feature that permits the CPO management system 100 to accept or reject a given CPO on behalf of certain agency-based sellers 130, 160 who have delegated such authority to the CPO management system 100. Thus, the CPO management system 100 preferably (i) evaluates CPO's on behalf of certain agency-based sellers 130, 160 who have delegated authority to the CPO management system 100 to accept or reject a given CPO, and (ii) permits broadcast-based sellers, such as sellers 140, 150 to evaluate CPO's independently.

Thus, the CPO management system 100 can preferably provide one or more CPO's to each broadcast-based seller 140, 150, for the seller 140, 150 to independently determine whether or not to accept a given CPO. It is noted that the CPO management system 100 can provide a CPO to each appropriate broadcast-based seller 140, 150, for example, by means of a broadcast transmission, or by means of posting the CPO, for example, on an electronic bulletin board accessible by each broadcast-based seller 140, 150. Alternatively, the CPO management system 100 can evaluate one or more CPO's against a number of CPO rules defined by one or more agency-based sellers 130, 160 to decide on behalf of an agency-based seller 130, 160 to accept or reject a given CPO. An illustrative set of CPO rules for illustrative agency-based sellers is set forth in FIG. 5.

Thus, the CPO management system 100 can determine if one or more sellers 140, 150 accepts a given CPO by broadcasting the CPO to each seller 140, 150 and receiving an acceptance or rejection, or by applying the CPO to the CPO rules to render a decision to either accept, reject or counter a CPO on behalf of an agency-based seller 130, 160.

As discussed further below, a CPO rule is a set of restrictions defined by a given agency-based seller 130, 160 for which the seller 130, 160 is willing to accept a CPO. For a more detailed discussion of CPO rules, the manner in which they are generated, and related security issues, see U.S. patent application Ser. No. 08/889,319, entitled Conditional Purchase Offer Management System, filed Jul. 8, 1997, and U.S. Pat. No. 5,794,207.

Figure 2:
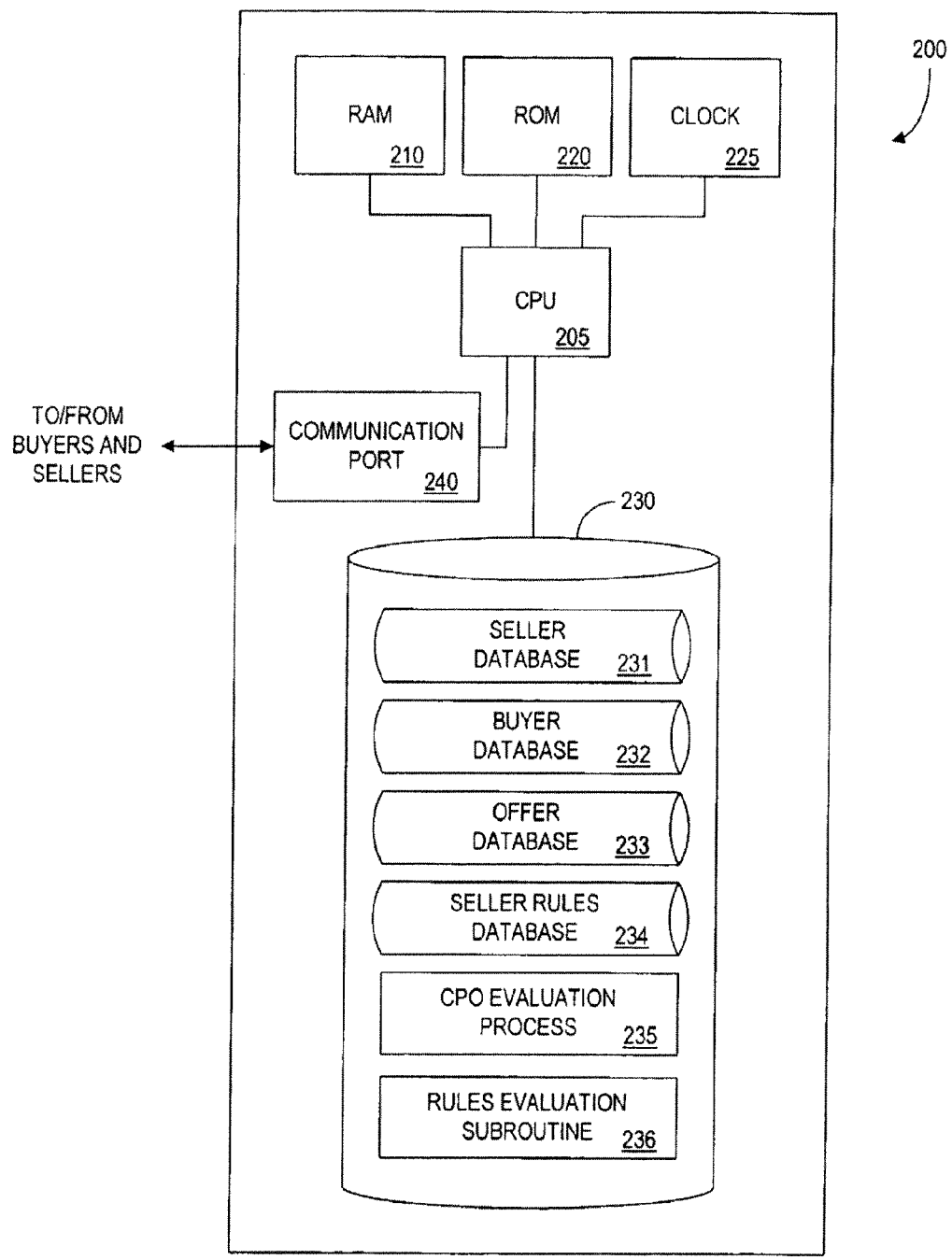
FIG. 2 is a block diagram illustrating elements of the central controller of the invention.

FIG. 2 is a block diagram showing the architecture of an illustrative central controller 200. The central controller 200 preferably includes certain standard hardware components, such as a central processing unit (CPU) 205, a random access memory (RAM) 210, a read only memory (ROM) 220, a clock 225, a data storage device 230, and a communications port 240. The CPU 205 is preferably linked to each of the other listed elements, either by means of a shared data bus, or dedicated connections, as shown in FIG. 2. The communications port 240 connects the central controller 200 to each buyer 110 and seller 130, 140, 150, 160. The communications port 240 preferably includes multiple communication channels for simultaneously establishing a plurality of connections.

The ROM 220 and/or data storage device 230 are operable to store one or more instructions, discussed further below in conjunction with FIGS. 3 through 8, which the CPU 205 is operable to retrieve, interpret and execute. For example, the ROM 220 and/or data storage device 230 preferably store processes to accomplish the transfer of required payments, charges and debits, between the sellers 130, 140, 150, 160 and buyers 110. The processing of such accounting transactions are preferably secured in a conventional manner, for example, using well-known cryptographic techniques.

The data storage device 230 includes at least a seller database 231, a buyer database 232, an offer database 233 and a seller rules database 234. The seller database 231 preferably stores information on each seller 130, 140, 150, 160 which is registered with the CPO management system 100 to sell goods or services to CPO buyers, including contact information. The buyer database 232 preferably stores information on each buyer of the CPO management system 100, including identification information and billing information, such as a credit card number. The offer database 233 preferably contains a record of each CPO being processed by the CPO management system 100, including the conditions associated with the CPO and the associated status. The seller rules database 234 preferably maintains the CPO rules for one or more agency-based sellers 130, 160.

In addition, the data storage device 230 includes a CPO evaluation process 235 and a rules evaluation subroutine 236, discussed further below in conjunction with FIGS. 3A, 3B and 4, respectively. Generally, the CPO evaluation process 235 (i) receives each CPO from a buyer 110, (ii) provides each CPO to the appropriate broadcast-based sellers 140, 150 and evaluates each CPO against the appropriate rules of each agency-based seller 130, 160 and (iii) determines whether any sellers 130, 140, 150, 160 accept the CPO. The rules evaluation subroutine 236 is a subroutine executed by the CPO evaluation process 235, which receives a CPO and compares the CPO against the rules of one or more agency-based sellers 130, 160 to generate a response on behalf of the sellers to the given CPO.

Having described the system of the present invention, a first method of the invention will be described. At step 301 of FIG. 3A, the system 100 receives a CPO from one of the plurality of buyers 110.

At step 303, the system determines whether the CPO is a valid offer.

At step 305, if the system determines that the CPO is not valid, the system requests the buyer retransmit the offer.

At step 307, with a valid offer, the system receives a payment identifier.

At step 309, the system determines whether the payment identifier is valid.

At step 311, if the system determines that the payment identifier is not valid, the system requests the buyer retransmit the payment identifier.

At step 313, the system transmits the offer to broadcast-based sellers and executes a rules evaluation subroutine for agency-based sellers. The rules evaluation subroutine is discussed below in conjunction with FIG. 4.

At step 315, when a seller accepts the CPO, the system receives at least one acceptance signal.

At step 317, when the system receives more than one acceptance signal, the system selects one acceptance signal.

At step 319, the system identifies the seller corresponding to the acceptance signal.

Figure 3A:
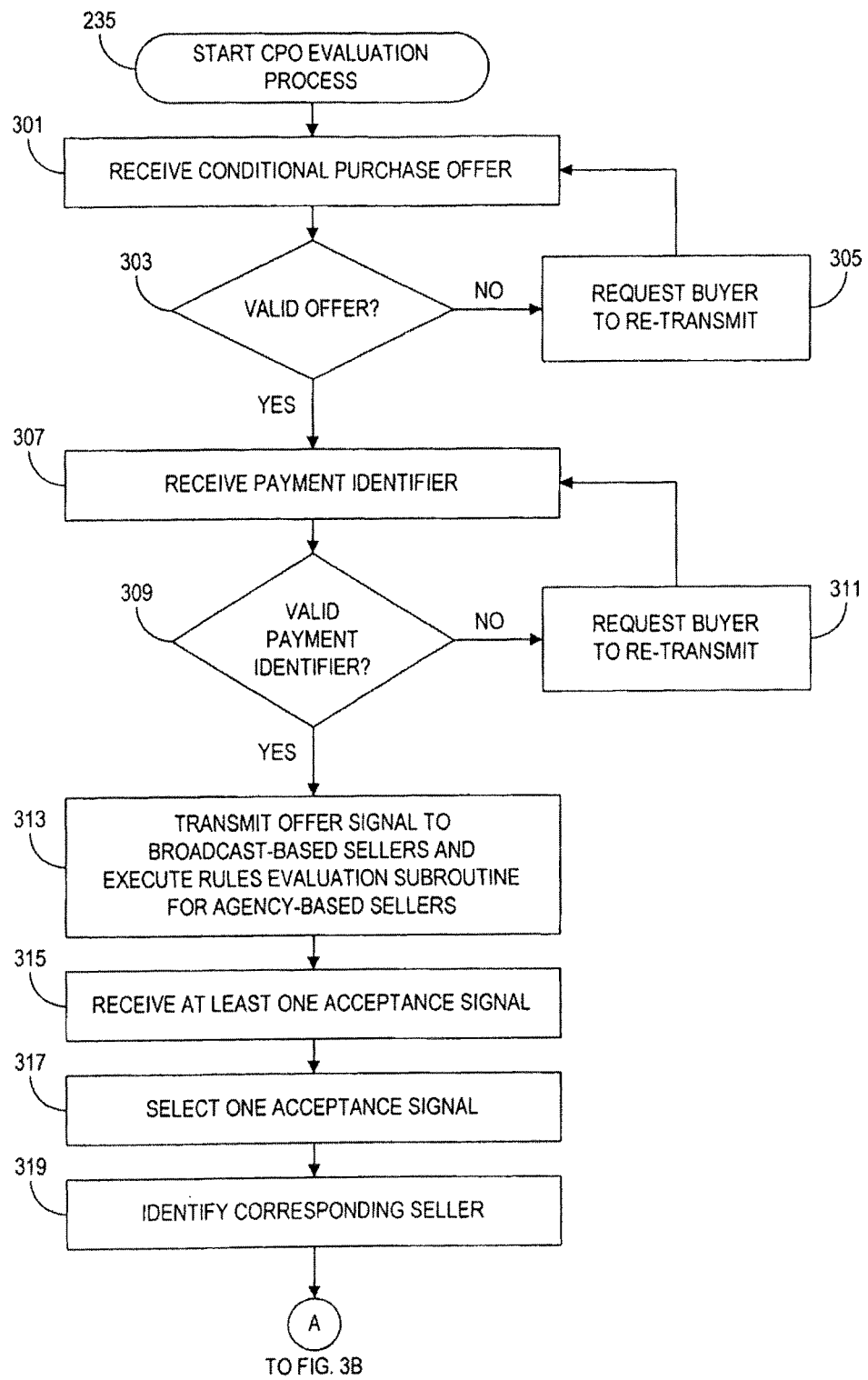
FIGS. 3A and 3B are a flow chart illustrating a CPO Evaluation Process in the method of the invention.
Figure 3B:
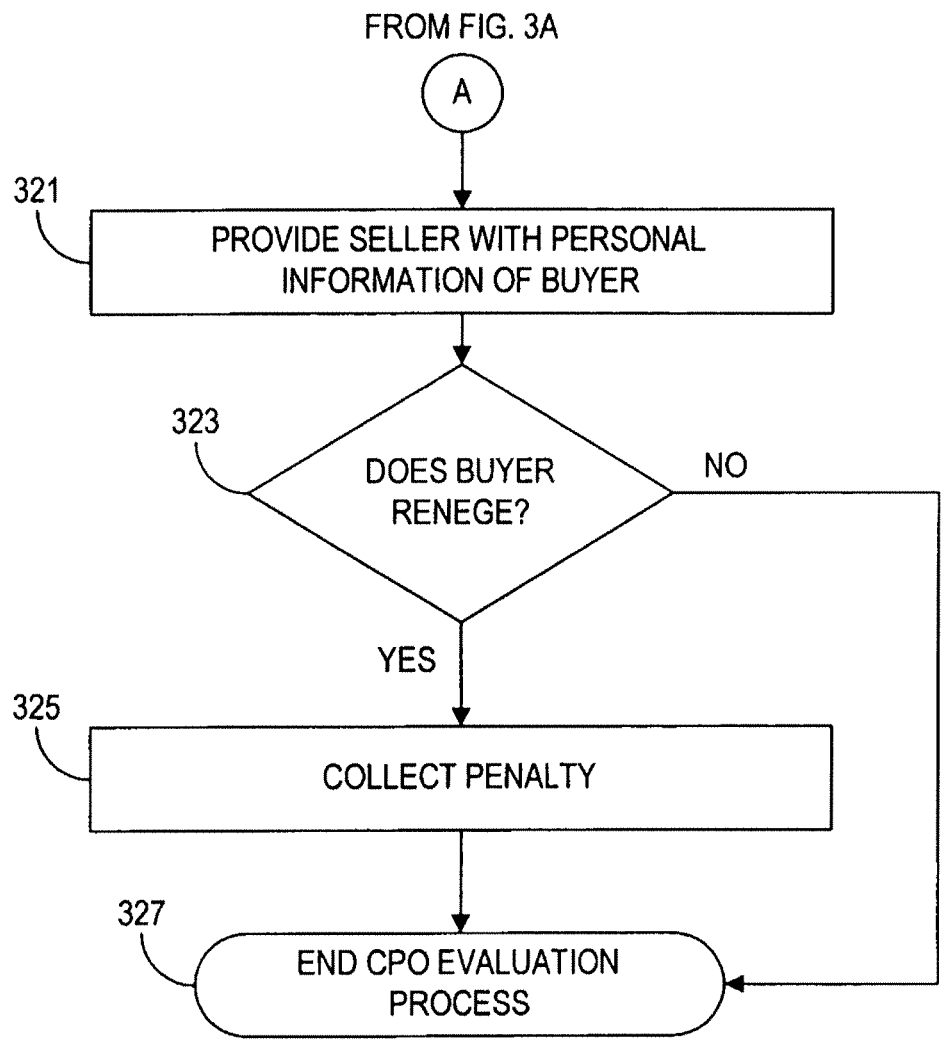

At step 321, of FIG. 3B, the system provides the selected seller with personal information of the buyer.

At step 323, if the CPO is not a binding CPO, the system determines whether the buyer defaulted or reneged.

At step 327, if the buyer does not default or renege, the system ends the CPO evaluation process.

At step 325, if the buyer defaults or reneges, the system collects a penalty from the buyer and then ends the CPO evaluation process at step 327.

As discussed above, the CPO evaluation process 235 executes a rules evaluation subroutine 236 during step 313 of FIG. 3A to determine if one or more agency-based sellers 130, 160 are willing to accept a CPO.

Figure 4:
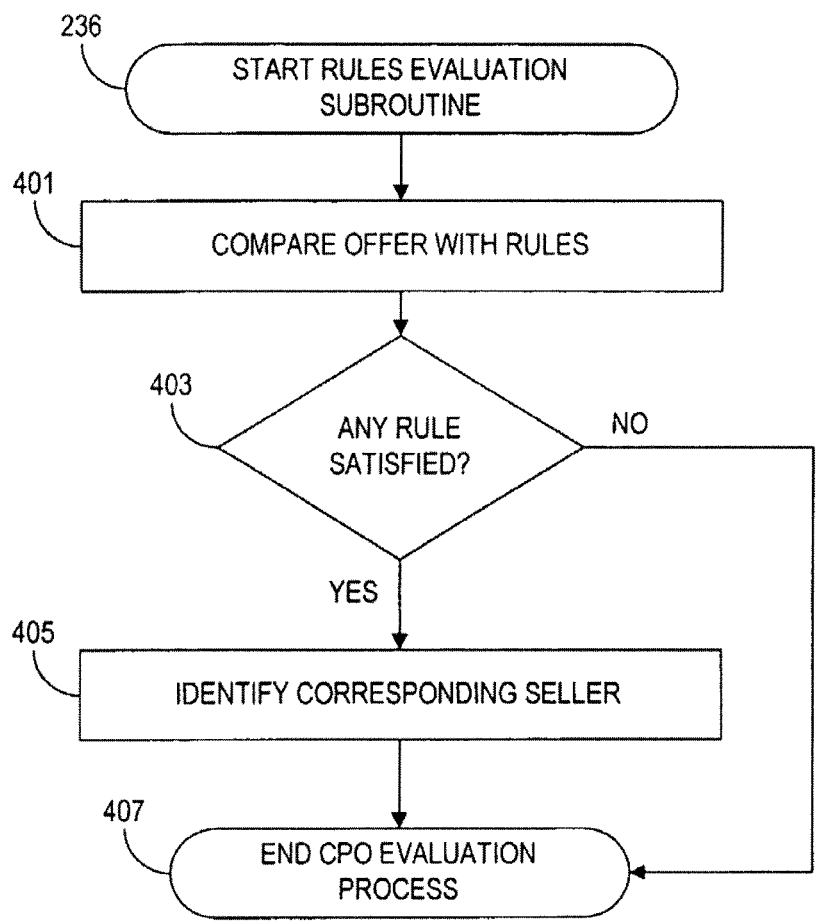
FIG. 4 is a flow chart illustrating a Rules Evaluation Subroutine in the method of the invention.

At step 401, of FIG. 4, the system compares the CPO with corresponding restrictions as set forth in any CPO rules that are defined by agency-based sellers 130, 160.

At step 403, the system determines whether any CPO rules are satisfied by the CPO.

At step 405, if the system determines that a CPO rule is satisfied, the system identifies the corresponding seller.

At step 407, the system returns to the rules evaluation subroutine with an indication of whether a rule was or was not satisfied at step 403.

The steps thus described and illustrated in FIGS. 3A, 3B and 4 allow the system to accept and validate a CPO; transmit the CPO to broadcast-based sellers; execute a rules evaluation routine for agency-based sellers; determine whether any seller accepts, and bind the CPO when a seller accepts (assuming the CPO is a Binding CPO). The method in FIGS. 3A, 3B and 4 does not provide a method to allocate a CPO among multiple agency-based sellers 130, 160. Such a method to allocate a CPO to multiple agency-based sellers in accordance with a predetermined strategy is described in greater detail with reference to FIGS. 5 through 8.

With multiple agency-based sellers, the system 100 uses information in the seller database (231 in FIG. 2), and the seller rules database (234 in FIG. 2) to determine whether any of the agency-based sellers can satisfy a CPO. As an example, in FIG. 5, the seller rules database (234 in FIG. 2) includes information on flight schedules 505 for multiple agency-based sellers of airtravel. Depending on the restrictions in a CPO, more than one of those agency-based sellers may be able to satisfying the CPO. Thus, if the CPO merely requires departure from New York and a destination in California during the first quarter of 1997, two agency-based sellers can satisfy the CPO. One agency-based seller 510 has a flight originating in New York on Jan. 1, 1997 and terminating in Los Angeles, with a stop in Chicago. Another agency-based seller 520 has a non-stop flight originating in New York on Mar. 3, 1997 and terminating in San Francisco. However, agency-based seller 530 is unable to satisfy the CPO because the departure point is not New York, and the date is not in the first quarter of 1997.

As thus described, with more than one agency-based seller able to satisfy a CPO, system 100 must have a method to allocate the CPO among the agency-based sellers. Additionally, when multiple agency-based sellers are able to satisfy a CPO and they are further able to satisfy the CPO at different prices, the system must desirable allocate the CPO to one particular agency-based seller, and must further allocate the CPO to one of the possible prices. These steps are described below in greater detail with reference to FIGS. 6 through 8.

Figure 6A:
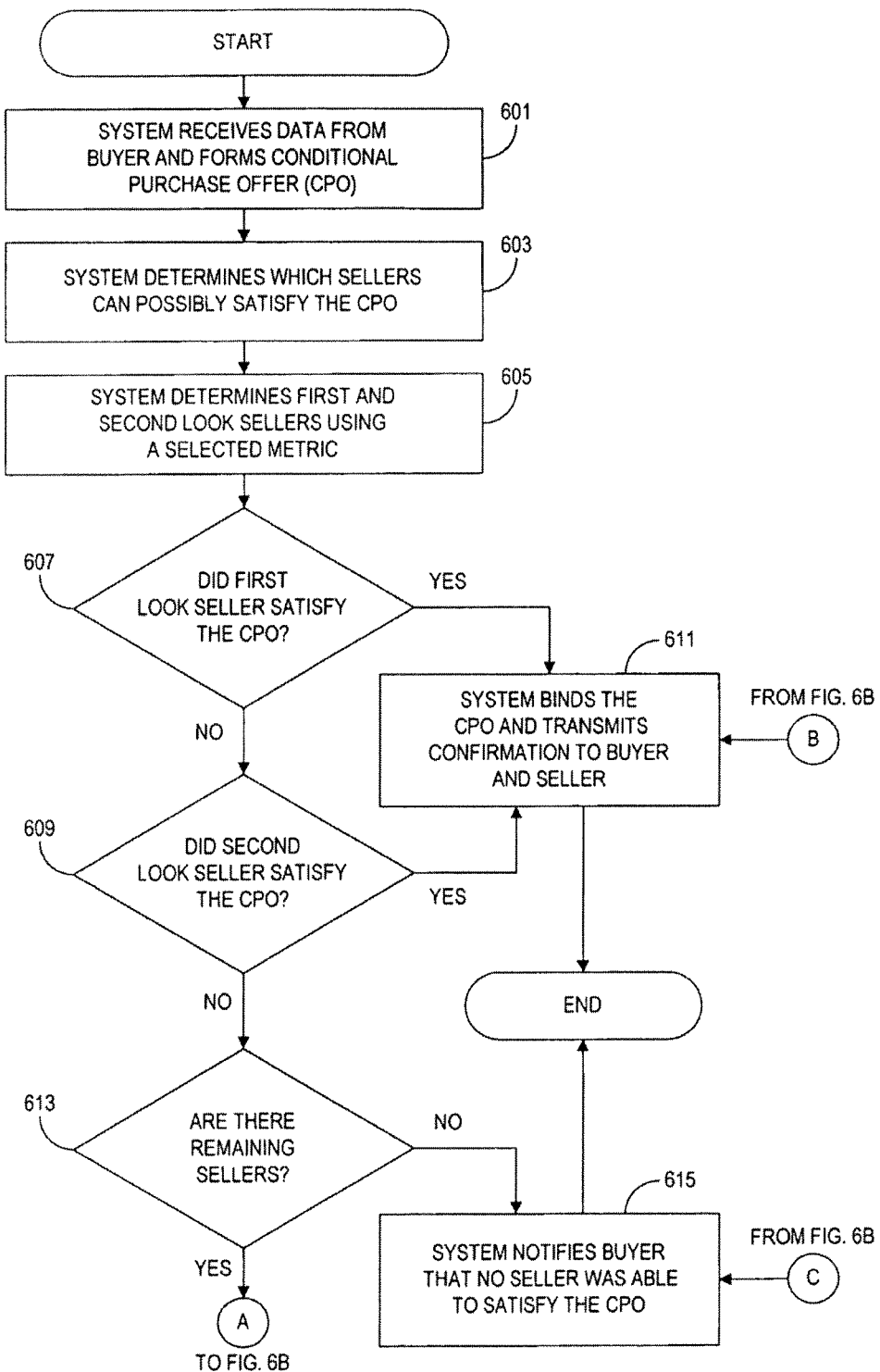
FIGS. 6A and 6B are a flow chart illustrating a preferred embodiment of the method of the invention.
Figure 6B:
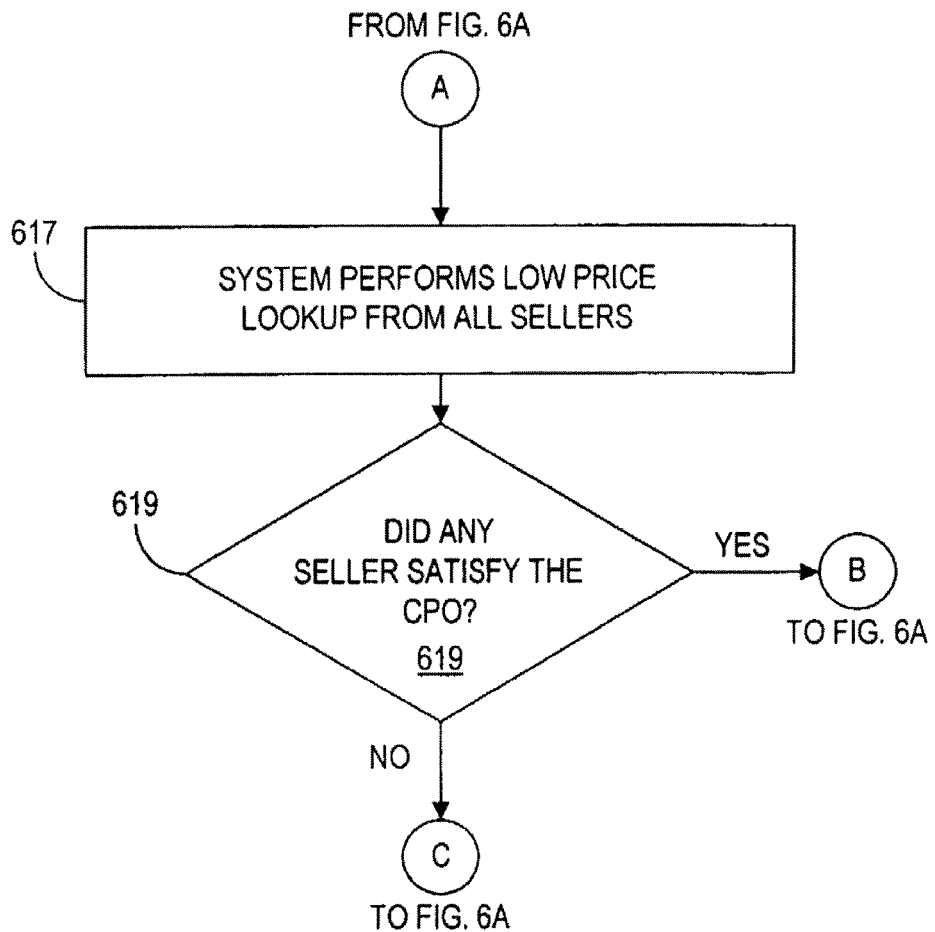

A method to allocate a CPO among multiple agency-based sellers is illustrated in FIGS. 6A and 6B. At step 601, system 100 receives data from a buyer and forms a CPO. This step is functionally the same as described at steps 301 through 311 in FIG. 3A.

At step 603, the system determines which of the agency-based sellers can possibly satisfy the CPO. As an example, if the CPO is for air travel with specified departure and destination points, only agency-based sellers servicing those departure and destination points can possibly satisfy the CPO. The other agency-based sellers are unable to satisfy the CPO and are excluded from further consideration. Similarly, if an agency-based seller has no qualifying prices that could satisfy the CPO, they are unable to satisfy the CPO and are excluded from further consideration. The system thus uses multiple factors to determine whether a seller can possibly satisfy the CPO.

At step 605, the system determines a first look opportunity seller from those agency-based sellers that can possibly satisfy the CPO. This determination is based on a metric, which in the preferred embodiment considers a relative market share of all the agency-based sellers that could satisfy the CPO. The system assigns the first look opportunity to the seller with the largest relative market share in the market offered in the CPO, with consideration for the number of first look opportunities provided to that agency-based seller versus the number of first look opportunities due to that agency-based seller.

The system records numbers of first look opportunities provided to sellers for different CPOs. This historic information forms part of the consideration for allocation of first look opportunities. When the system receives a new CPO, the historic information on opportunities provided for each seller is compared to the number of opportunities that are due for each seller. As a result of many factors, the number of opportunities due and the number of opportunities provided are seldom in agreement and the system attempts to bring them into closer agreement by weighting or biasing allocation to the seller that is most out of agreement. The disagreement can be a simple numerical difference between opportunities due and provided, or a percentage difference between opportunities due and provided.

With multiple factors considered in the metric to determine which agency-based seller gets the first look opportunity, some weighting or priority of factors is required. If the relative market share is normalized among agency-based sellers who can possibly satisfy the CPO, that relative market share can have a value between zero percent (0%) and one hundred percent (100%). With two agency-based sellers, A & B, that can each satisfy the CPO, and seller A having three times the relative market share of seller B in the relevant market, then seller A with the larger share would have a relative market share of 75%, while seller B with the smaller share would have a relative market share of 25%.

With these relative market shares in the relevant market, seller A will receive seventy five percent (75%) of the first look opportunities (e.g., three out of four first look opportunities), while seller B will receive twenty five percent (25%) of the first look opportunities (e.g., one out of four first look opportunities).

At step 605, the system also determines the seller receiving the second look opportunity in the same manner that the first look opportunity is determined.

At step 607, the system determines whether the seller receiving the first look opportunity satisfied the CPO.

At step 609, if the seller receiving the first look opportunity did not satisfy the CPO, the system determines whether the seller receiving the second look opportunity satisfied the CPO.

At step 611, if either of the sellers receiving the first look opportunity or the second look opportunity satisfies the CPO, the system binds the CPO, to create a Binding CPO, and informs both the buyer and seller.

At step 613, if neither of the sellers receiving the first look opportunity or second look opportunity satisfied the CPO, the system determines whether there are remaining sellers.

At step 615, if there are no remaining sellers, the system notifies the buyer that no seller was able to satisfy the CPO.

At step 617, of FIG. 6B, if there are remaining sellers, the system performs a low price lookup from all sellers, and selects the lowest price satisfying the CPO.

At step 619, the system determines whether any seller satisfied the CPO. If a seller was able to satisfy the CPO, the system binds the CPO and informs the buyer and seller at step 611 of FIG. 6A.

If no seller was able to satisfy the CPO during the low price lookup, the system so notifies the buyer at step 615 of FIG. 6A.

As illustrated in FIGS. 6A and 6B, the system gives the highest priority agency-based seller an opportunity to satisfy the CPO. It is possible that an agency-based seller will be able to satisfy a CPO with more than one rule. For example, if a CPO includes a price term of $300.00, and the priority agency-based seller can satisfy the CPO with two rules having prices of $250.00 and $270.00, the system must decide which rule to fulfill the CPO with. In the example, the CPO binds at $300.00, but the specific question is whether the system fulfils the CPO at $250.00 or $270.00.

In the described embodiment, when more than one rule satisfies the CPO, the system selects the highest value or highest priced rule that will satisfy the CPO. In this manner, the system fulfils the CPO at the highest price or value satisfying the CPO, though the system binds the CPO at the price specified by the buyer. This ensures that the agency-based seller can also fulfil another CPO, which could only be fulfilled at the lower price. It also assures agency-based sellers that they will receive the maximum possible revenue for each CPO they fulfil. Without these assurances, certain agency-based sellers might decline to participate.

It is also possible that factors other than price are used instead of or in addition to price in selecting a particular seller. In the airline industry examples of these other factors include: level of service; date/time of flight; seat class or booking options; and day of week of travel.

Using the CPO management system illustrated in FIGS. 1 and 2, the preferred embodiment of the method illustrated in FIGS. 6A and 6B allows agency-based sellers a first look and second look opportunity to fulfil or satisfy a CPO, based on a predetermined metric. The metric described is relative market share in a relevant market. When a seller can satisfy a CPO with more than one rule, the system allows the seller to maximize revenue with the highest price or highest value CPO. Various alternative embodiments are also available.

The metric that system 100 uses at step 605 of FIG. 6A to determine the first and second look sellers can be something other than an adjusted market share. For example, the metric can be based on total market share, without adjustment for the relevant market (e.g. origin/destination pair). Alternatively, the metric can be based on a random number. It is also possible that a buyer preference metric is used. A buyer preference metric can be a buyer requirement regarding a particular agency-based seller as a condition of the CPO. For example, the buyer may indicate a preference for a particular agency-based seller or an unwillingness to accept a particular agency-based seller.

Figure 7:
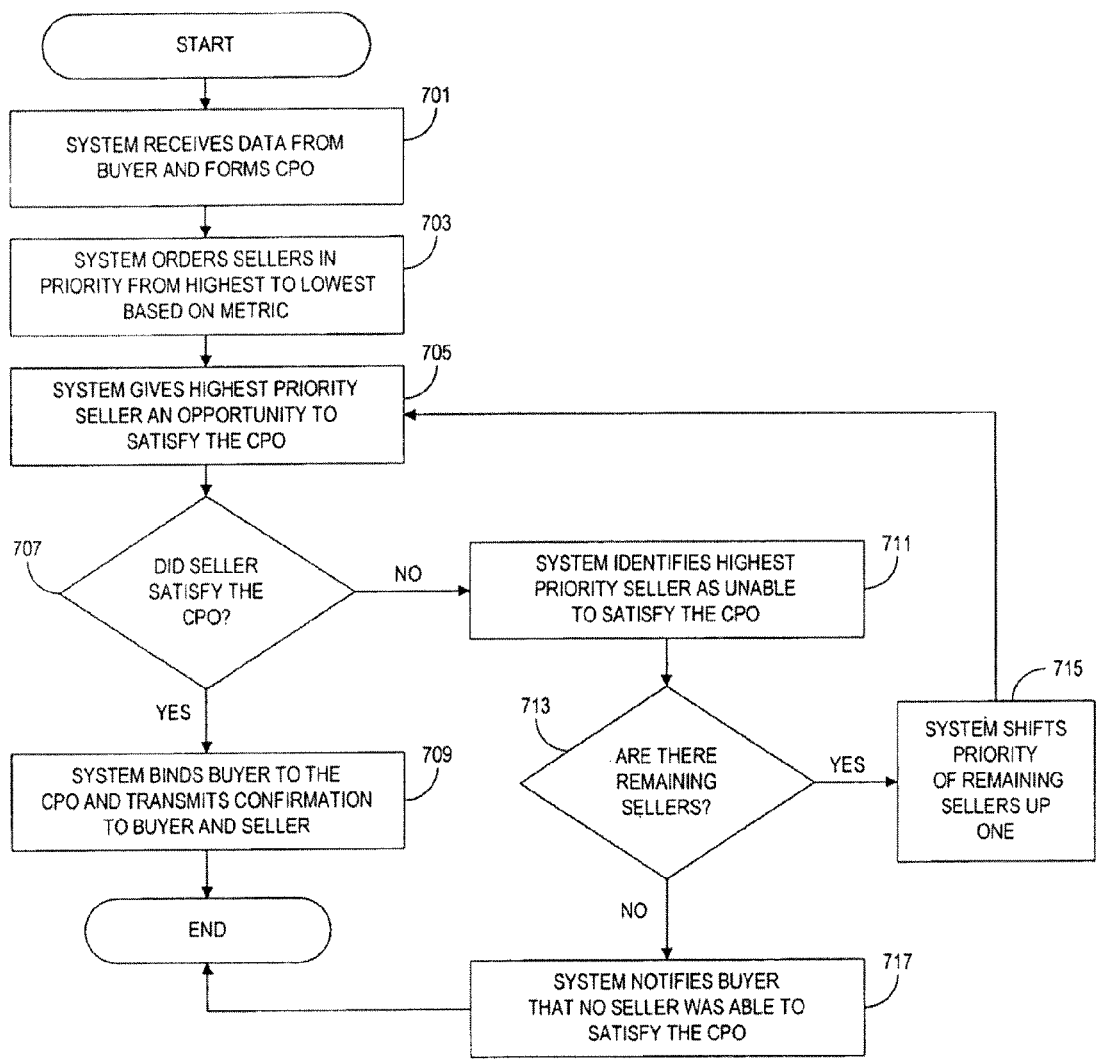
FIG. 7 is a flow chart illustrating an alternative embodiment of the method of the invention.
Figure 8:
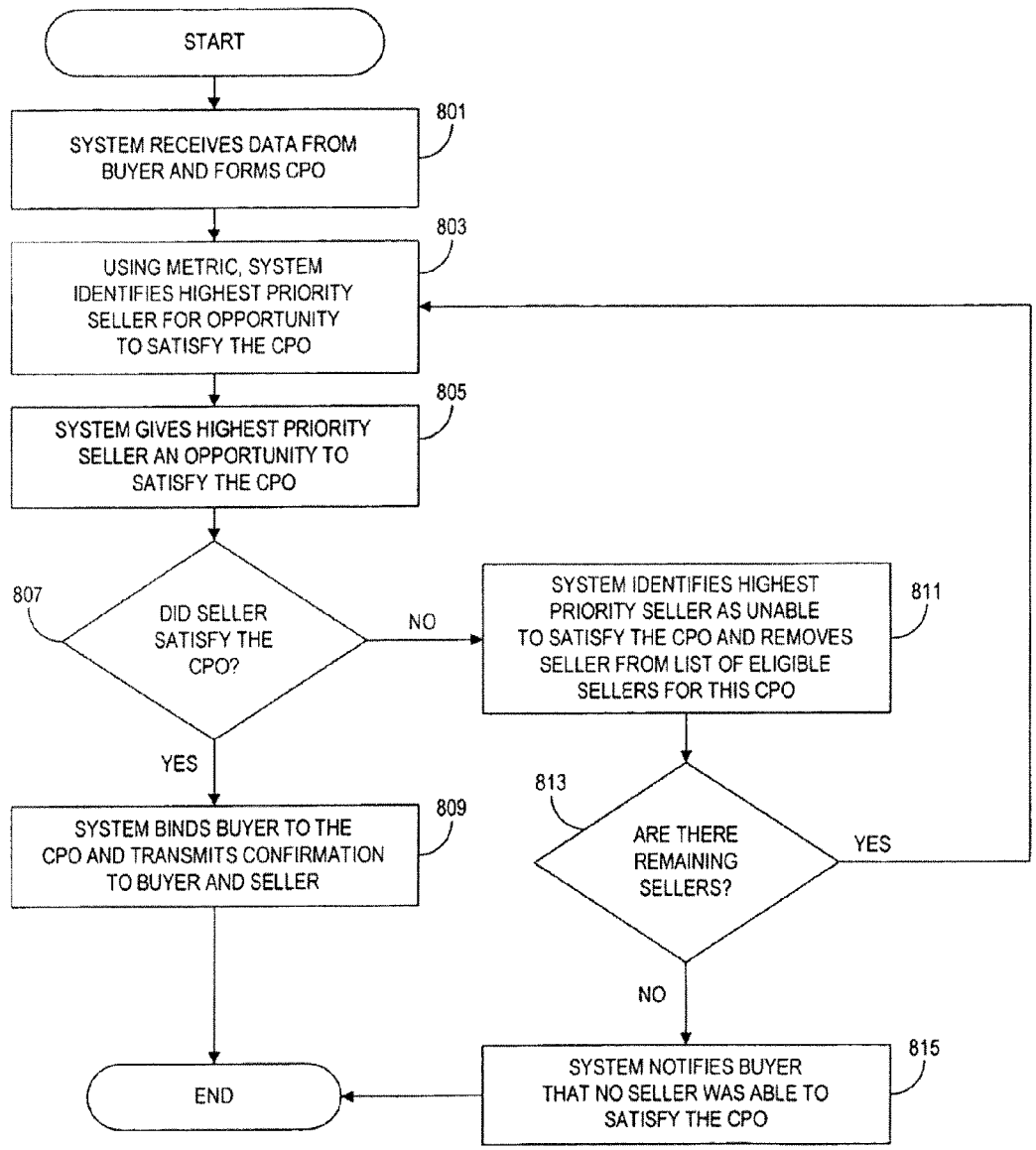
FIG. 8 is a flow chart illustrating an alternative embodiment of the method of the invention.

FIGS. 7 and 8 illustrate alternative embodiments for the method of the invention. In the first alternative embodiment, at step 701, system 100 receives data from a buyer and forms a CPO. This step is functionally the same as described at steps 301 through 311 in FIG. 3A.

At step 703, system 100 orders agency-based sellers in priority order from highest to lowest for the first look opportunity to satisfy the CPO. As previously described, system 100 uses a metric such as market share, adjusted market share, random number or a buyer specific metric to order the sellers.

At step 705, system 100 gives the highest priority seller a first look opportunity to satisfy the CPO.

At step 707, system 100 determines whether the seller was able to satisfy the CPO.

At step 709, if the seller was able to satisfy the CPO, the system binds the CPO and informs the buyer and seller.

At step 711, if the system determined that the seller was not able to satisfy the CPO, the system identifies that highest priority seller as unable to satisfy the CPO.

At step 713, the system determines whether there are any remaining sellers.

At step 715, if there are remaining sellers, the system shifts the priority of all remaining sellers up by one.

The system then gives the new highest priority seller a second look opportunity to satisfy the CPO at step 705. The process repeats with other look opportunities (third, fourth etc.) until a seller satisfies the CPO at step 707, or the system determines that no sellers remain at step 713.

At step 717, if the system determines that no sellers remain, the system notifies the buyer that no seller was able to satisfy the CPO.

In another embodiment illustrated in FIG. 8, at step 801, system 100 receives data from a buyer and forms a CPO. This step is functionally the same as described at steps 301 through 311 in FIG. 3A.

At step 803, system 100 identifies the highest priority seller for a first look opportunity to satisfy the CPO. Determining priority of sellers is accomplished with a metric, such as the previously described adjusted market share, market share, random number, and buyer specific metric.

At step 805, system 100 gives the highest priority seller a first look opportunity to satisfy the CPO.

At step 807, the system determines if the highest priority seller satisfied the CPO.

At step 809, if the seller satisfied the CPO, the system binds the CPO and informs the buyer and seller.

At step 811, if the seller did not satisfy the CPO, the system identifies that highest priority seller as unable to satisfy the CPO and removes that highest priority seller from the eligible list of sellers for the CPO.

At step 813, the system determines whether there are remaining sellers.

If there are remaining sellers, at step 803, the system identifies the highest priority seller for a second look opportunity to satisfy the CPO. In this manner, the method continues with other look opportunities (third, fourth, etc.) until the system determines that a seller satisfies the CPO at step 807, or the system determines that no sellers remain at step 813.

In this manner, sellers may be reprioritized according to the selected metric with any influence of a higher priority but non-filling seller removed.

At step 815, if there are no remaining sellers, the system informs the buyer that no seller was able to satisfy the CPO.

FIGS. 7 and 8 illustrate alternative embodiments of the method of the invention using the system illustrated in FIGS. 1 and 2. In these alternatives, sellers are prioritized according to a metric and sellers are given an opportunity to satisfy the CPO according to their priority order.

Structural Advantage Embodiment

In an alternate embodiment, an allocation system is used to provide an advantage or disadvantage to one or more participating agency-based sellers. In this embodiment, the objective of the system is to create imbalance in an attempt to favor a specific seller without providing that favored seller with all of the first look opportunities.

In one example of this embodiment, the CPO management system allocates first look opportunities to the plurality of agency-based sellers on the basis of market share between two points. When a first look opportunity is allocated to a "favored seller", it does not count as being allocated unless the favored seller binds or fulfills the offer. This creates a structural advantage in that if the favored seller does not fulfill the offer, the favored seller automatically receives a first look at the next unit of demand between those two points.

It is understood that there are many methods by which a CPO management system can provide a structural advantage or disadvantage to one or more agency-based sellers.

Other Embodiments

The airline industry is used as an example, however, any industry in which the buyer-driven commerce model can be applied is appropriate for the system and method of the invention.

The embodiments thus described disclose allocation among Agency-Based Sellers. It is also envisioned that the invention provide allocation among Broadcast-Based Sellers. Similarly, the invention envisions allocation among multiple sellers including a combination Agency-Based and Broadcast-Based Sellers.

The embodiments have described the invention in the context of a Binding CPO. However, the invention is also appropriate for circumstances where the CPO is not binding.

In another embodiment, a CPO may contain a seller-defined variable or flexible condition, typically specified using a range. For example, the variable condition may be a date range within which the product may be delivered by the seller. Other variable conditions might include: a price range, a performance range, a quality range, etc. . . . . The seller may then choose a product to fill the buyer's flexible condition within the specified range. Such a variable condition may provide substantial assistance to the seller in filling the buyer's CPO. For example, with respect to an airline ticket, the seller may be able to be meet a buyer's specified price if the CPO permits him to select a flight within a range of times or days.

It is desirable that in one embodiment the present invention include features that prevent buyers from repetitively querying, or 'pinging,' the system, to determine the underlying price flexibility of the sellers. Such pinging might result in potential damage to the seller's price margins and profitability. As mentioned above, requiring a buyer to enter into a Binding CPO at least discourages pinging by insuring that if an offer is accepted, the product is actually purchased. Another method of discouraging pinging includes preventing buyers from submitting repetitive, similar offers. For example, repetitive CPOs changing only the offer price in an effort to determine price flexibility may be blocked by the system. In one embodiment, subsequent CPOs by the same buyer are accepted by the CPO Management System only if there is some substantial change to the buyer specifications that would result in the purchase of an essentially different product. For example, with respect to the sale of airline tickets, subsequent CPOs may be accepted for processing only if there is a significant change in the itinerary. Yet another method for discouraging pinging is to require a payment for each submission of a CPO.

In another embodiment of the invention, sellers identities are maintained anonymous within the CPO Management System until a CPO is accepted. Such identity anonymity, by itself and in combination with the discouragement of price pinging discussed herein, enables sellers to participate in the CPO Management System process without fear of undercutting their published price structures and losing their regular customer base. For example, most retailers have published product prices, and loyal customers who willingly pay those prices. Participating in the CPO Management System enables a seller to discount those products, potentially below its published prices, to fill offers from buyers who might not otherwise pay published prices. With anonymity, these sellers can more freely participate in the CPO Management System process with less fear of losing their regular customers and undercutting their published price structure.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

We claim:

1. A processor-implemented allocation method in a buyer-driven system in which conditional purchase offers are received and considered by or on behalf of a plurality of sellers, the conditional purchase offers each including:
   (1) a buyer-specified price for a good or service,
   (2) a payment identifier specifying a financial account to be used to pay for said good or service upon acceptance of a conditional purchase offer by a seller, and
   (3) authorization to charge said payment identifier for said good or service upon acceptance of a conditional purchase offer, comprising:
      identifying by the processor one of at least two sellers as a priority seller based on a processor-implemented priority metric, wherein identifying one of at least two sellers as a priority seller includes:
         determining a number of first look opportunities to satisfy conditional purchase offers due to the at least two sellers;
         determining a number of first look opportunities to satisfy conditional purchase offers given to the at least two sellers;
         identifying one of the at least two sellers with the largest deficiency between first look opportunities given and first look opportunities due as the priority seller; and
      providing the priority seller with a first look opportunity to satisfy a conditional purchase offer after receiving said buyer-specified price, payment identifier and authorization to charge said payment identifier for said good or service upon acceptance of the conditional purchase offer.

2. The method of claim 1, wherein identifying by the processor one of at least two sellers as a priority seller further comprises:
   determining whether the at least two sellers can possibly satisfy the conditional purchase offer.

3. The method of claim 2, wherein the conditional purchase offer is for air travel and wherein determining whether the at least two sellers can possibly satisfy the conditional purchase offer further comprises:
   determining whether the at least two sellers service departure and destination points associated with the at least one conditional purchase.

4. The method of claim 3, wherein determining whether the at least two sellers can possibly satisfy the conditional purchase offer is further based on at least one of: level of service, date of flight, day of week of travel, and seat class.

5. The method of claim 2, wherein determining whether the at least two sellers can possibly satisfy the conditional purchase offer further comprises:
   comparing the buyer-specified price to at least one qualifying seller price associated with each of the at least two sellers.

6. The method of claim 5, wherein the at least one qualifying seller price comprises at least two qualifying seller prices associated with at least one of the at least two sellers, and further comprising:
   selecting a highest qualifying seller price from the at least two qualifying seller prices, wherein the highest qualifying seller price is charged to the payment identifier.

7. The method of claim 1, wherein determining a number of first look opportunities to satisfy conditional purchase offers due to the at least two sellers further comprises:
   identifying a relevant market for the at least two sellers; and
   determining a relative market share within the relevant market for each of the at least two sellers.

8. The method of claim 7, wherein the conditional purchase offer is for air travel and wherein the relevant market is based on an air travel origin/destination pair.

9. The method of claim 1, further comprising:
   incrementing a number of first look opportunities to satisfy conditional purchase offers given for the priority seller.

10. The method of claim 9, wherein incrementing a number of first look opportunities to satisfy conditional purchase offers given for the priority seller further comprises:
    determining if the priority seller is a favored seller;
    determining if the priority seller has fulfilled the conditional purchase offer; and
    incrementing the number of first look opportunities to satisfy conditional purchase offers given for the priority seller only after the priority seller has fulfilled the conditional purchase offer when the priority seller is a favored seller.

11. A processor-implemented allocation method in a buyer-driven system in which conditional purchase offers are received and considered by or on behalf of a plurality of sellers, the conditional purchase offers each including:
    (1) a buyer-specified price for a good or service, (2) a payment identifier specifying a financial account to be used to pay for said good or service upon acceptance of a conditional purchase offer by a seller, and (3) authorization to charge said payment identifier for said good or service upon acceptance of a conditional purchase offer, comprising:

identifying by the processor one of at least two sellers as a priority seller based on a processor-implemented priority metric, wherein identifying one of at least two sellers as a priority seller includes:

determining a percentage of first look opportunities to satisfy conditional purchase offers due to the at least two sellers based on an adjusted market share;

determining a percentage of first look opportunities to satisfy conditional purchase offers given to the at least two sellers;

identifying one of the at least two sellers with the largest deficiency between percentage of first look opportunities given and percentage of first look opportunities due as the priority seller; and providing the priority seller with a first look opportunity to satisfy a conditional purchase offer after receiving said buyer-specified price, payment identifier and authorization to charge said payment identifier for said good or service upon acceptance of the conditional purchase offer.

12. A processor-implemented allocation method in a buyer-driven system in which conditional purchase offers are received and considered by or on behalf of a plurality of sellers, the conditional purchase offers each including:

(1) a buyer-specified price for a good or service, (2) a payment identifier specifying a financial account to be used to pay for said good or service upon acceptance of a conditional purchase offer by a seller, and (3) authorization to charge said payment identifier for said good or service upon acceptance of a conditional purchase offer, comprising:

identifying by the processor one of at least two sellers as a priority seller, based on a processor-implemented priority metric, wherein identifying one of at least two sellers as a priority seller includes:

determining a market share for each of the at least two sellers;

identifying one of the sellers having the largest market share that could also satisfy the conditional purchase offer as the priority seller; and providing the priority seller with a first look opportunity to satisfy a conditional purchase offer after receiving said buyer-specified price, payment identifier and authorization to charge said payment identifier for said good or service upon acceptance of the conditional purchase offer.

13. A system for allocation in a buyer-driven system in which conditional purchase offers are received and considered by or on behalf of a plurality of sellers, the conditional purchase offers each including:

(1) a buyer-specified price for a good or service, (2) a payment identifier specifying a financial account to be used to pay for said good or service upon acceptance of a conditional purchase offer by a seller, and (3) authorization to charge said payment identifier for said good or service upon acceptance of a conditional purchase offer, comprising:

means for identifying one of at least two sellers as a priority seller based on a processor-implemented priority metric, wherein means for identifying one of at least two sellers as a priority seller includes:

means for determining a number of first look opportunities to satisfy conditional purchase offers due to the at least two sellers;

means for determining a number of first look opportunities to satisfy conditional purchase offers given to the at least two sellers;

means for identifying one of the at least two sellers with the largest deficiency between first look opportunities given and first look opportunities due as the priority seller; and means for providing the priority seller with a first look opportunity to satisfy a conditional purchase offer after receiving said buyer-specified price, payment identifier and authorization to charge said payment identifier for said good or service upon acceptance of the conditional purchase offer.

14. A system for allocation in a buyer-driven system in which conditional purchase offers are received and considered by or on behalf of a plurality of sellers, the conditional purchase offers each including:

(1) a buyer-specified price for a good or service, (2) a payment identifier specifying a financial account to be used to pay for said good or service upon acceptance of a conditional purchase offer by a seller, and (3) authorization to charge said payment identifier for said good or service upon acceptance of a conditional purchase offer, comprising:

means for identifying one of at least two sellers as a priority seller based on a processor-implemented priority metric, wherein means for identifying one of at least two sellers as a priority seller includes:

means for determining a percentage of first look opportunities to satisfy conditional purchase offers due to the at least two sellers based on an adjusted market share;

means for determining a percentage of first look opportunities to satisfy conditional purchase offers given to the at least two sellers;

means for identifying one of the at least two sellers with the largest deficiency between percentage of first look opportunities given and percentage of first look opportunities due as the priority seller; and means for providing the priority seller with a first look opportunity to satisfy a conditional purchase offer after receiving said buyer-specified price, payment identifier and authorization to charge said payment identifier for said good or service upon acceptance of the conditional purchase offer.

15. A system for allocation in a buyer-driven system in which conditional purchase offers are received and considered by or on behalf of a plurality of sellers, the conditional purchase offers each including:

(1) a buyer-specified price for a good or service, (2) a payment identifier specifying a financial account to be used to pay for said good or service upon acceptance of a conditional purchase offer by a seller, and (3) authorization to charge said payment identifier for said good or service upon acceptance of a conditional purchase offer, comprising:

means for identifying one of at least two sellers as a priority seller based on a processor-implemented priority metric, wherein means for identifying one of at least two sellers as a priority seller includes:

means for determining a market share for each of the at least two sellers;

means for identifying one of the sellers having the largest market share that could also satisfy the conditional purchase offer as the priority seller; and means for providing the priority seller with a first look opportunity to satisfy a conditional purchase offer after receiving said buyer-specified price, payment identifier and authorization to charge said payment identifier for said good or service upon acceptance of the conditional purchase offer.

\* \* \* \* \*